United States Patent [19]

Meyer et al.

[11] Patent Number: 5,228,880
[45] Date of Patent: Jul. 20, 1993

[54] CLIMBING VEHICLE

[75] Inventors: Burton C. Meyer, Downers Grove; Eugene Jaworski, Park Ridge; John R. Wildman, North Riverside, all of Ill.

[73] Assignee: Meyer/Glass Design, Chicago, Ill.

[21] Appl. No.: 919,779

[22] Filed: Jul. 23, 1992

[51] Int. Cl.$^5$ .............. A63H 17/26; B62D 57/00
[52] U.S. Cl. .................. 446/448; 446/465; 180/7.1
[58] Field of Search ........... 446/465, 462, 448, 437, 446/433; 180/7.1, 8.3, 8.7; 301/41.1, 1

[56] References Cited

U.S. PATENT DOCUMENTS

| | | | |
|---|---|---|---|
| 3,672,458 | 6/1972 | Mackerle | 180/8.7 |
| 3,913,982 | 10/1975 | Brewer | 301/41.1 X |
| 4,353,428 | 10/1982 | Kovar et al. | 180/7.1 |
| 4,380,135 | 4/1983 | Wildman et al. | 446/433 |
| 4,547,173 | 10/1985 | Jaworski et al. | 446/457 |
| 4,601,519 | 7/1986 | D'Andrade | 301/45 |
| 4,643,696 | 2/1987 | Law | 446/465 |
| 4,648,853 | 3/1987 | Siegfried | 446/448 |
| 5,102,367 | 4/1992 | Mullaney et al. | 446/448 |

FOREIGN PATENT DOCUMENTS 2600944 1/1988 France .

*Primary Examiner*—Mickey Yu

[57] ABSTRACT

A drive mechanism for a toy vehicle. The drive mechanism connects a drive shaft of the vehicle to a driven wheel having an axis of rotation. It includes a first arm affixed to the vehicle drive shaft for rotation therewith. A second arm is affixed to the wheel axle for rotation with the axle. The first and second arms are pivotally connected together at a position offset from the drive shaft and the wheel axis. A spring biases the arms into an overlapping relationship in which, during normal rolling movement of the vehicle, the drive shaft is aligned with the driven wheel so that the wheel rotates about the axis of the drive shaft. A first stop is provided to engage the arms to limit rotation of the arms about their pivotal connection relative to each other in the direction of rotation of the wheel axle. A second stop engages the arms to limit rotation of the arms away from each other towards a fully extended position.

4 Claims, 2 Drawing Sheets

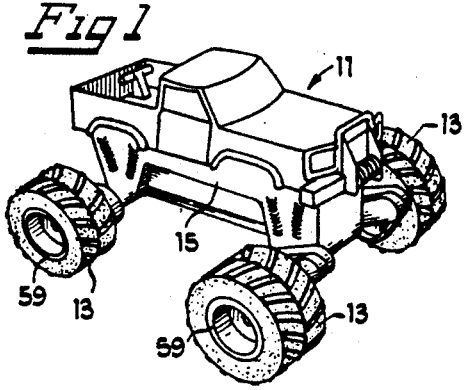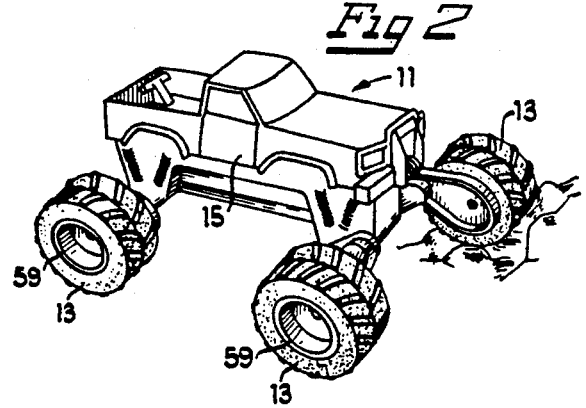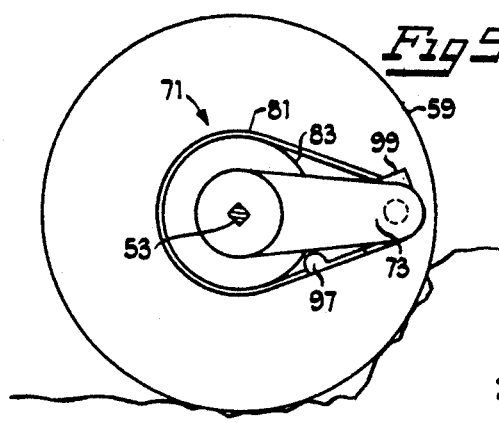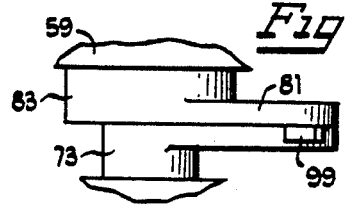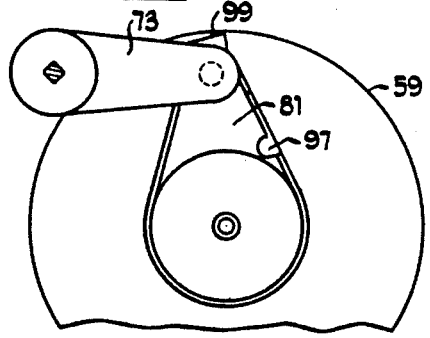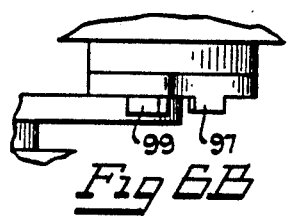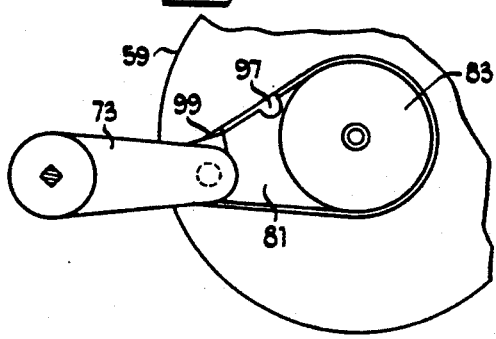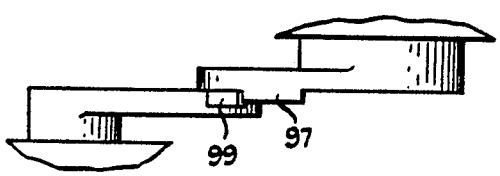

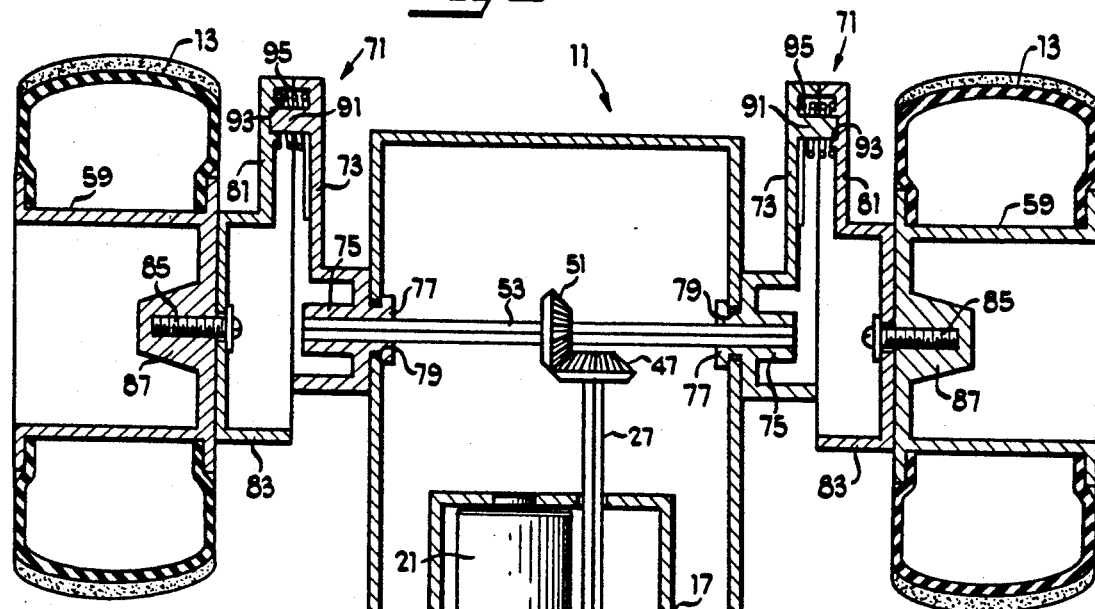
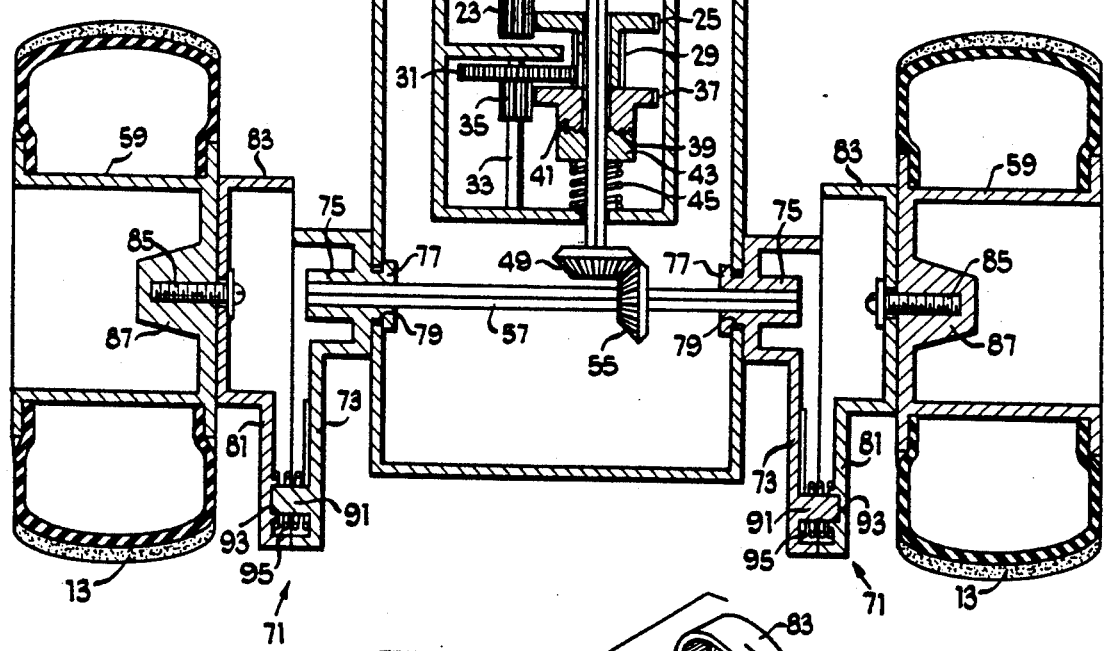
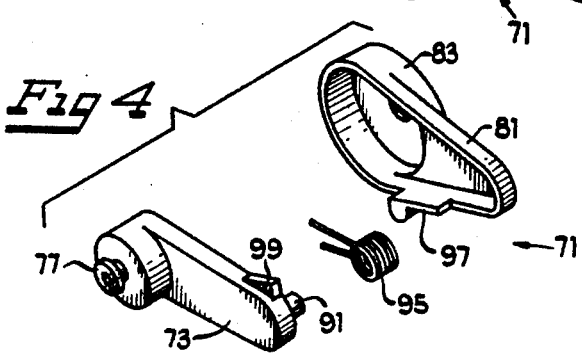

CLIMBING VEHICLE

BACKGROUND AND SUMMARY OF THE INVENTION

This invention is directed to a toy vehicle having wheels mounted in a novel manner which enables it not only to roll on the wheels but also to utilize the wheels as the ends of extended arms to enable the vehicle to crawl over obstacles.

The invention is particularly directed to a toy vehicle which utilizes wheels mounted on scissor-like arms which arms extend from a folded to an extended condition when the rotating wheel encounters an obstacle to provide an arm-like climbing member which extends the effective diameter of the obstructed wheel.

Another object of this invention is a drive mechanism between a drive shaft and a driven wheel which utilizes a pair of folded arms to maintain the wheel and the drive shaft rotating on the same axle when the wheel is rolling but which unfold when the wheel encounters an obstacle to provide an increased effective wheel diameter to enable the vehicle to overcome obstacles.

Another object of this invention is a toy vehicle which utilizes wheels mounted on scissor-like arms which arms extend from folded to extended positions when a wheel encounters an obstacle in which the scissor-like arms of each wheel operates independently of the arms of the other wheels of the toy vehicle.

Other objects of the invention may be found in the following specification, claims, and drawings.

BRIEF DESCRIPTION OF THE DRAWINGS

The invention is illustrated more or less diagrammatically in the following drawings wherein:

FIG. 1 is a perspective view of a toy vehicle embodying the novel features of this invention in its normal operating mode;

FIG. 2 is a perspective view of the vehicle of FIG. 1 showing the operation of the vehicle when a wheel encounters an obstacle;

FIG. 3 is a horizontal cross-sectional view of the vehicle and its drive mechanism;

FIG. 4 is an exploded view of one of the wheel drive mechanisms;

FIG. 5A is a side elevational view of one of the wheels of the vehicle shown at the instant of encountering an obstacle;

FIG. 5B is a partial enlarged view of the wheel drive mechanism of FIG. 5A;

FIG. 6A is a side elevational view similar to that of FIG. 5A but showing the arms of a wheel drive mechanism in a partially extended position;

FIG. 6B is an enlarged partial view of the wheel drive mechanism of FIG. 6A;

FIG. 7A is a partial side elevational view of the wheel drive mechanism of FIG. 5A shown in its fully extended position; and FIG. 7B is an enlarged cross-sectional view of the wheel drive mechanism of FIG. 7A.

DESCRIPTION OF THE PREFERRED EMBODIMENT

FIG. 1 of the drawings shows a toy vehicle 11 in the form of a replica of a four wheel drive vehicle of the type which is capable of being operated off the road. The replica of the vehicle shown is a pickup truck but, of course, it should be understood and appreciated that the invention may be applied to other vehicle styles. As is conventional, such a vehicle has tires 13 which are small scale replicas of off the road vehicle tires which have large V-shape treads. Of course, other types of treads and tires may also be used.

Referring now to FIG. 3 of the drawings, the vehicle 11 is shown with a hollow body 15 which conventionally may be formed of a suitable plastic. Located in the hollow body 15 is a motor compartment 17 which may also contain a source of power such as batteries which are not shown since they are conventional. The power source supplies current to a miniature, high speed, electric motor 21. A pinion 23 connected to the drive shaft of the electric motor 21 meshes with a spur gear 25 rotatably mounted over a drive shaft 27 which extends through the motor compartment 17. The spur gear 25 is formed integrally with a smaller diameter pinion gear 29 that engages a spur gear 31 formed on an idler shaft 33. The spur gear 31 is also formed integrally with a smaller diameter pinion gear 35 which engages a spur gear 37 also rotatably mounted on the drive shaft 27. The spur gear 37 has a clutch face 39 on axial end thereof which engages a complementary clutch face 41 on a clutch member 43. Clutch member 43 is slidably mounted on the drive shaft 27 for axial movement but rotates with the drive shaft. The clutch member 43 is biased against the clutch face 39 by means of a spring 45. The preceding gear train provides a speed reduction from the high speed pinion 23 of the electric motor to the slower speed of the drive shaft 27.

Affixed to opposite ends of the drive shaft 27 are bevel gears 47 and 49. Bevel gear 47 meshes with a complementary bevel gear 51 affixed to axle drive shaft 53 while bevel gear 49 meshes with a complementary bevel gear 55 affixed to axle drive shaft 57. The axle drive shafts 53 and 57 drive the wheels 59 of the vehicle on which the tires 13 are mounted.

Each wheel 59 is connected to an axle drive shaft 53 or 57 by a drive mechanism 71. An exploded view of a typical drive mechanism 71 is shown in FIG. 4 of the drawings and FIGS. 5A through 7B show the operation and details of one of the drive mechanisms 71 as it encounters and overcomes an obstacle. As can be seen in the aforementioned drawings and in FIG. 3 of the drawings, each drive mechanism 71 includes a first arm 73 which is in the shape of a hollow, open-sided, elongated housing. Also formed integrally with the arm is an axle drive shaft receiving sleeve 75 which affixes the arm to a shaft 53 or 57 for rotation therewith. Each sleeve 75 is formed with an integral flange 77 which encircles a passage 79 in the hollow body 15 of the vehicle to provide a rotational mounting of the arm to the hollow vehicle body.

The drive mechanism 71 also includes a second arm 81 which is in the form of a hollow, open-sided housing having an enlarged cylindrical cupola portion 83. A screw 85 fastens the cupola portion of the second arm 81 to a thickened hub portion 87 of the wheel 59. Thus, the wheel 59 is fixed to and cannot rotate relative to its arm 81. A shaft 91 formed integrally with arm 73 is journalled in a shallow socket 93 in the arm 81. A coil spring 95 fits over the shaft 91 and has fingers which engage the drive mechanism arms 73 and 81 to bias them to a folded position of the arms shown in FIGS. 3 and 5A of the drawings. A stop 97 formed on the second arm 81 engages the arm 73 to limit movement of the arms passed the closed position shown in FIG. 5A of the drawings. A second stop 99 is also formed on arm 73 and engages the arm 81 to limit opening movement of the arms relative toward each other as shown in FIG. 7A of the drawings.

The toy vehicle 11 of this invention operates in the following manner. When traversing a smooth surface without obstacles in the manner shown in FIG. 1 of the drawing, the wheel 59 rotates about the same axis as the axle drive shaft 53 or 57 on which it is mounted. The wheel rotates an axle drive shaft because the spring 95 keeps the arms 73 and 81 of the drive mechanism 71 in their closed or non-extended positions shown in FIGS. 1, 3, and 5A of the drawings. When the drive mechanism arms are in their closed positions, the axis of the wheel 59 defined by the screw 85 is aligned with its respective axle drive shaft and the drive mechanism 71 rotates about axle drive shaft 53 or 57 under the driving force of the drive shaft 27. When a tire 13 of a wheel 59 engages an obstacle as shown in FIGS. 2 and 5A of the drawings, the wheel 59 and its supporting arm 81 essentially stop rotating but the first arm 73 continues to rotate as powered by its axle drive shaft 53 or 57. This causes the arm 81 to rotate in an opposite or counter-clockwise direction as viewed in FIG. 6A of the drawings against the closing force of the spring 95. Accordingly, the arms 73 and 81 move from their closed position to an open position shown in FIG. 7A of the drawings, in effect, moving the arm 81 to a fully extended position relative to the arm 73 by rotating it about their connecting shaft 91. The tire 13 and wheel 59 in their extended positions continue to rotate about their axle drive shaft 53 or 57 but instead of having the wheel 59 aligned with the axle drive shaft 53 or 57, it is offset a considerable distance which in effect provide a larger effective diameter for the tire 13 enabling it to crawl over obstacles. When the wheel 59 overcomes an obstacle, the spring 95 will bias the arms 73 and 81 to their closed positions bring the hub of the wheel 59 back into alignment with its axle drive shaft 53 or 57, respectively. Thus, the drive mechanism of this invention automatically extends and retracts the hub 87 of the wheel 59 as at the end of a folding arm or claw as obstacles are encountered and overcome. Each wheel of the vehicle has its own drive mechanism 71 which operates independently of the other wheels and their drive mechanisms on the vehicle.

I claim:

1. A drive mechanism connecting a drive shaft and a driven wheel having an axis of rotation, said drive mechanism including:
   a first arm affixed to said drive shaft for rotation therewith,
   a second arm affixed to said wheel at said axis for rotation therewith,
   a pivotal connection between said first and second arms,
   means biasing said arms into an overlapping relationship in which said drive shaft is aligned with said driven wheel axis so that said wheel rotates about the axis of said drive shaft,
   first stop means engaging said arms to limit rotation of said arms about their pivotal connection relative to each other in the direction of rotation of said wheel axis, and
   second stop means engaging said arms to limit rotation of said arms away from each other beyond a fully extended position.

2. The drive mechanism of claim 1 in which said pivotal connection between said first and second arms is offset from said drive shaft and said wheel axis.

3. A toy vehicle including,
   at least one drive axle shaft,
   means to drive said shaft,
   a drive mechanism attached to each end of said drive axle shaft,
   a wheel attached to each drive mechanism and having an axis of rotation,
   said drive mechanism including:
   a first arm affixed to said drive shaft for rotation therewith,
   a second arm affixed to said wheel at said axis for rotation therewith,
   a pivotal connection between said first and second arms,
   means biasing said arms into an overlapping relationship in which said drive shaft is aligned with said driven wheel axis so that said wheel rotates about the axle of said drive shaft,
   first stop means engaging said arms to limit rotation of said arms about their pivotal connection relative to each other in the direction of rotation of said wheel axis, and
   second stop means engaging said arms to limit rotation of said arms away from each other beyond a fully extended position.

4. The toy vehicle of claim 3 in which said pivotal connection between said first and second arms is offset from said drive shaft and said wheel axis.

* * * * *